United States Patent [19]
Vorachek

[11] 3,746,282
[45] July 17, 1973

[54] HIGH ALTITUDE STREAMLINED BALLOON

[75] Inventor: Jerome J. Vorachek, Barberton, Ohio

[73] Assignee: Goodyear Aerospace Corporation, Akron, Ohio

[22] Filed: May 3, 1971

[21] Appl. No.: 139,425

[52] U.S. Cl. .................................................. 244/31
[51] Int. Cl. ............................................... B64b 1/58
[58] Field of Search ................... 244/30, 31, 33, 24, 244/29, 7, 5

[56] References Cited
UNITED STATES PATENTS
1,019,514   3/1912   Moya ..................................... 244/5
1,637,432   8/1927   Wallis .................................. 244/30
3,119,579   1/1964   Borgeson et al. ...................... 244/31
3,298,634   1/1967   Kantor et al. ......................... 244/31

OTHER PUBLICATIONS
Booda, Larry, "USAF Balloon Achieves Endurance Mark," Aviation Week, July 16, 1962, p. 30.

Primary Examiner—Milton Buchler
Assistant Examiner—Jesus D. Sotelo
Attorney—J. G. Pere and L. A. Germain

[57] ABSTRACT

A streamlined super-pressure balloon, in a substantially collapsed prelaunch condition, ascends vertically expanding to superpressure at float altitude. The weight distribution of the balloon envelope and payload maintains the center of gravity below the center of buoyancy and the changing geometric relationship between the center of gravity and center of buoyancy is such to effect rotation of the balloon from a vertical ascent attitude to a horizontal flight position at float altitude.

8 Claims, 5 Drawing Figures

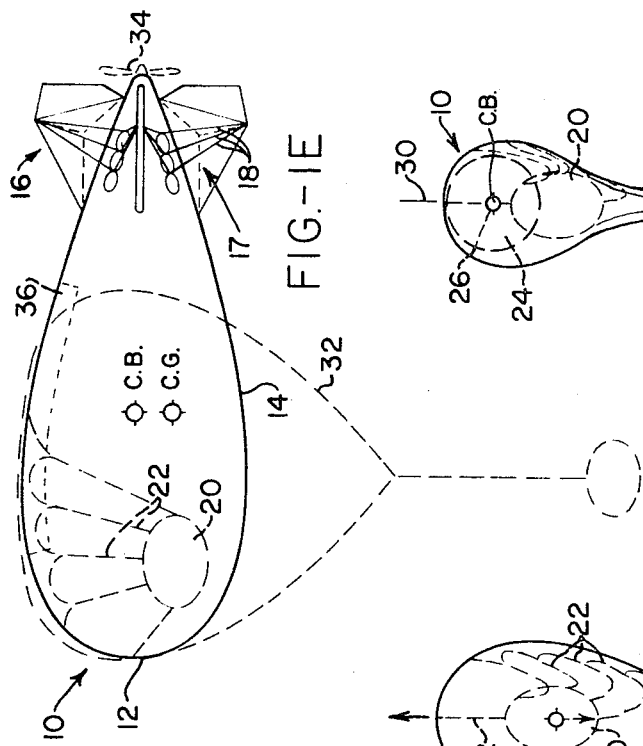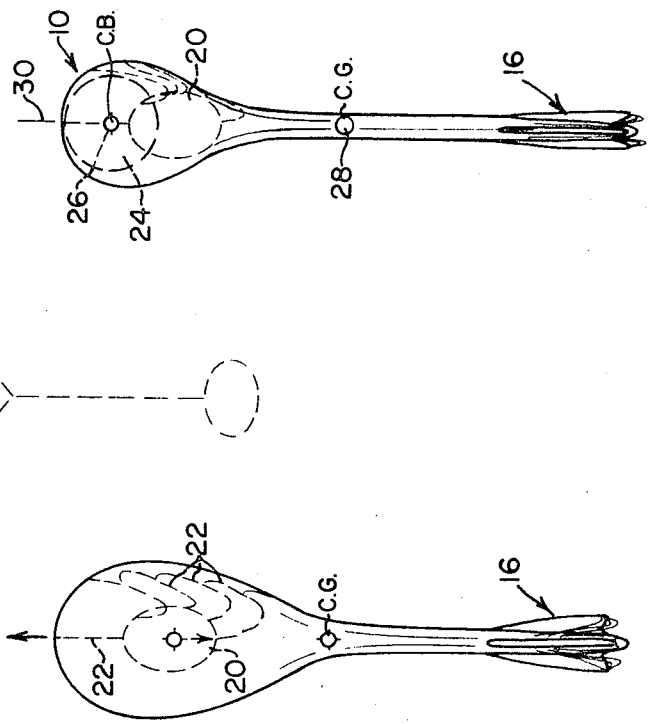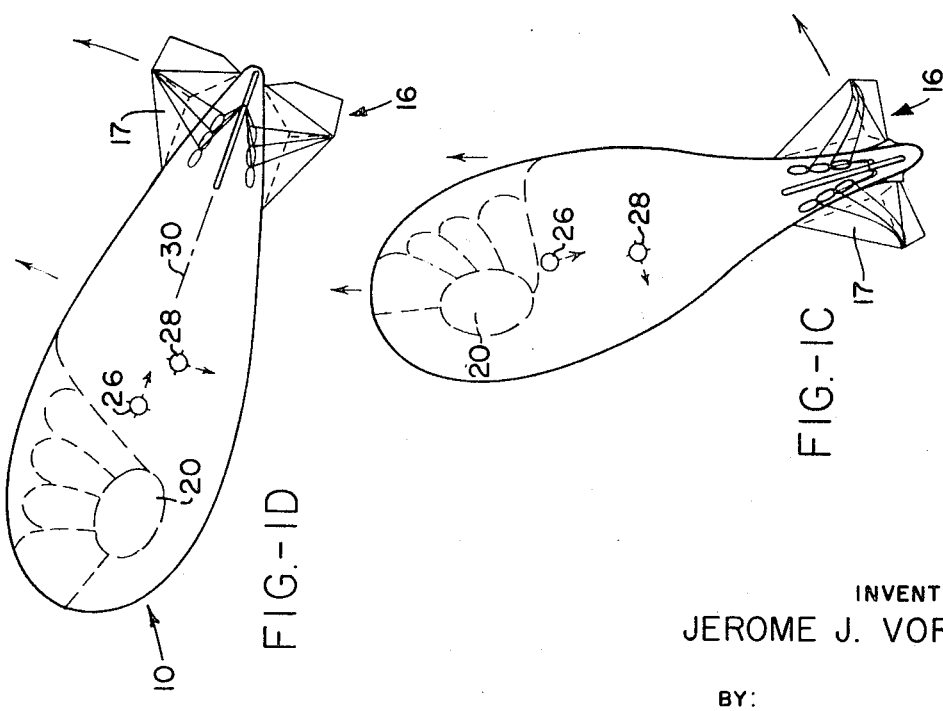

HIGH ALTITUDE STREAMLINED BALLOON

In the art of launching non-tethered balloons for extremely high altitude research, it is generally recognized that, in order to reach the maximum altitude for a particular vehicle, an aerodynamically streamlined configuration during ascent substantially overcomes the turbulent atmospheric conditions in both the horizontal and vertical directions and generally provides an increase in ascent velocity. To this end, many and various schemes have been devised to maintain the streamlined shape in a more or less controlled manner during the ascent. These schemes generally consider that at launch a small gas bubble is formed at the upper end of the balloon envelope that has sufficient lifting capability to carry the weight of the balloon envelope and the payload aloft. As the balloon rises in altitude, the bubble expands filling the envelope until its float altitude is reached.

While these prior art schemes are successful in establishing very high float altitudes for large natural or streamlined shaped vehicles, they are not successful in long endurance flights over a specific geographical area because of the effect of winds aloft. Vehicles of this type are generally large volume envelopes capable of carrying instrument payloads suspended in some manner below the vehicles and, in this configuration, offer large cross-sectional areas to the effects of horizontal winds.

Therefore, it is a primary object of this invention to provide a balloon for extremely high altitude and extended duration flight that suffers least from the effects of winds aloft.

An additional object is to provide a fast rising, streamlined, superpressure, and constant altitude balloon that ascends vertically and upon approaching its float altitude, rotates into a horizontal flight position.

A further object is to provide a high altitude balloon that lends itself to powered, station-keeping applications.

These and other objects and advantages will become apparent from the following specification and drawing wherein FIGS. 1A to 1E illustrate the invention in various stages of flight.

With reference to the drawing, FIG. 1E shows a streamlined balloon 10 in a substantially horizontal flight position at its float altitude. The balloon 10 is a superpressure envelope constructed of film-fabric laminates having strength characteristics in the circumferential direction that are at least twice that in the longitudinal direction. A superpressure envelope is used to permit extended flight at a constant density altitude and any increases in superpressure due to supertemperature are contained by the strength of the envelope. Multilaminate films of this type are generally known to those skilled in the art and are utilized in this application because of their lightweight, high strength, gastight characteristics.

The balloon envelope is a streamlined shape resembling a teardrop and characterized by a substantially rounded nose 12, a tapering body 14, and an empennage 16. A streamlined balloon that met the needs of the invention has the following characteristics:

Volume (V) = $1 \times 10^6$ cubic feet
Length (L) — 267 feet
Diameter (D) — 89 feet
Radius (R) — 44.5 feet
Surface Area (S) — 57,317.3 ft$^2$
Max. Diameter Location — 0.35L
Prismatic Coefficient — 0.60
Fineness Ratio — 3.00 where the prismatic coefficient is the ratio of the actual volume to that of a cylinder of equal length and maximum diameter and the fineness ratio is the ratio of the length to the maximum diameter.

Other size balloons of lesser or greater volume and having the same prismatic coefficient and fineness ratio may be computed using the following relationships:

$$V = 0.60 \pi R^2 L \quad L = \sqrt[3]{36V/0.6\pi}$$

$$R = L/6$$

$$S = 2.415 DL$$

Coordinates for the shape and change in surface area for streamlined balloons having fineness ratios in a range from 2.00 to 5.00 may be computed and will meet the needs of the invention, and it is considered that the invention is not limited thereto or thereby.

As herebefore mentioned, the balloon envelope has an empennage 16 at its rearward portion. These tail surfaces are constructed of a tubular framework covered with a membrane skin 17 to facilitate collapsing and packaging. In a fully deployed position, cable braces 18 provide stabilization and rigidity to the tail surfaces.

Suspended within the balloon envelope is a payload 20 that is positioned by suspension members 22. The suspension members are connected to the inside of the envelope at the nose and the top in order to position the payload on the baloon axis during vertical ascent and below the axis during horizontal flight as illustrated in FIGS. 1A and 1E respectively. The weight of the payload 20 and its location within the balloon structure provides a means to locate the center of gravity of the system in an advantageous position for vertical ascent and horizontal flight. The payload offsets the additional weight of the empennage and may be used to maintain the proper center of gravity/center of buoyancy relationship necessary to meet the objects of the invention. It should be understood, however, that other means may be used to accomplish the desired center of gravity/center of buoyancy relationship. For example, if the payload is an instrument package that is extremely lightweight and ultra-sensitive to environment influences, then the addition of weight to the payload may effect its operation. In this circumstance, it is possible to compensate for the weight differential by designing additional material weight into the balloon envelope. Also, in the case of an extra heavy payload, the proper weight balance may be added to the empennage 16. In any case, the location of the payload within the balloon envelope is advantageous in that no additional drag is added in either vertical ascent or horizontal flight.

In operation, the balloon 10 is launched in a vertical ascent position illustrated in FIG. 1A. A bubble of lifting gas 24 is introduced into the balloon envelope that is sufficient to carry the weight of the envelope and the payload aloft. Enough additional lifting gas is provided to handle any leakage and to maintain superpressure at float altitude. In its launch condition, the balloon is substantially collapsed and the center of buoyancy 26 is located high in the nose 12 of the envelope while the center of gravity 28 is located on the balloon axis 30 in a position determined by the payload and envelope combined weight. As the balloon rises, the gas expands filling the envelope in a nose-to-tail direction and the center of buoyancy 26 tends to move downward as illustrated in FIG. 1B. Upon approaching its float altitude, the ascent rate falls off and the envelope is essentially fully deployed. At the same time, the center of buoyancy has moved to a geometric position relative to the center of gravity to effect a rotation of the balloon from its vertical ascent attitude to a substantially horizontal float position. It should be understood that while the center of buoyancy moves in a nose-to-tail direction along the balloon axis, the center of gravity has a lateral displacement to a position below the balloon axis and is at all times in a relative position below the center of buoyancy. At its float altitude, the balloon reaches superpressure providing rigidity to the substantially inelastic envelope and remains at constant density altitude.

From the foregoing, the advantages of the invention become readily apparent. A streamlined balloon is launched in the conventional manner of "natural" shaped balloons but maintains a vertical ascent configuration that tends to increase the ascent rate because of its low drag shape. Further, the location of the payload within the balloon envelope adds no additional drag to the system in either the ascent or horizontal flight modes. In horizontal flight the streamlined balloon exhibits directional stability by nature of its empennage and offers less surface area to the winds aloft than an equal lift natural shape balloon illustrated in FIG. 1E by the dashed lines 32. In a station-keeping mode the streamlined balloon may be powered by an electric motor driven propellor 34 which receives its energy during daylight from a solar cell array 36 which may be mounted on the balloon envelope, and during nighttime flight from batteries that are part of the payload 20 and which may be re-energized during daytime by the solar array.

While only one embodiment of the invention has been illustrated and described in detail, it is to be particularly understood that the invention is not limited thereto or thereby, but that various modifications may still fall within the scope of the appended claims.

What is claimed is:

1. A high altitude balloon comprising, a streamlined superpressure envelope defining the shape of the balloon, lifting gas within the envelope capable of carrying the balloon to float altitude and expanding the envelope to superpressure, and means carried within the balloon envelope to provide a center of gravity and center of buoyancy relationship that changes at increasing altitude to effect rotation of the balloon from a substantially vertical ascent attitude to a substantially horizontal flight position at the balloon float altitude.

2. The balloon of claim 1 wherein the means carried within the balloon envelope is a payload suspended by members attached to the envelope such that in vertical ascent the payload is located on the balloon axis, and in horizontal flight the payload is located below the balloon axis.

3. The balloon of claim 1 wherein the stream-lined envelope has a fineness ratio in the range of 2.00 to 5.00

4. The balloon of claim 3 wherein the superpressure envelope is characterized by a multilaminate film construction having strength characteristics in the circumferential direction at least twice that in the longitudinal direction, and an empennage of collapsible framework and web surfaces stabilized by cable braces attached to the envelope.

5. A constant level high altitude balloon comprising, a superpressure envelope defining a stream-lined configuration having a fineness ratio in the range of 2.00 to 5.00, a payload suspended within the envelope such that it is positioned on the balloon axis when in an initial vertical attitude and positioned below the balloon axis when in a final horizontal attitude, and lifting gas within the envelope in an amount to lift the combined weight of the envelope and payload and to expand the envelope to superpressure at the balloon float altitude, said envelope and payload having a weight distribution that maintains the center of gravity below the center of buoyancy regardless of the ballon attitude and the geometric relationship between the center of gravity and the center of buoyancy effects a rotation of the balloon from a vertical ascent attitude to a horizontal flight position at float altitude.

6. The balloon of claim 5 wherein the envelope is characterized by a substantially rounded nose, an elongated tapered body, and an empennage of collapsible frame and web surfaces, said envelope of a multilaminated film construction having strength characteristics in the circumferential direction at least twice that in the longitudinal direction.

7. A method of flying a constant level high altitude streamlined balloon carrying a payload comprising, providing a superpressure envelope defining a streamlined shape, filling the balloon envelope with a bubble of a lifting gas capable of carrying the balloon and payload aloft and expanding the envelope to superpressure, positioning the payload within the balloon envelope such that the geometric relationship between the center of gravity and center of buoyancy with increased altitude effects rotation of the balloon from a vertical ascent attitude to a horizontal flight position at the balloon float altitude, and launching the balloon in a substantially vertical ascent attitude.

8. A method of establishing at a constant high level altitude a streamlined balloon having an axis defined as a straight line running from the nose to the tail thereof and carrying a payload, comprising, providing a superpressure envelope having a fineness ratio in the range of 2.00 to 5.00, filling the envelope with a bubble of lifting gas capable of carrying the balloon and payload aloft and expanding the envelope to superpressure at the balloon float altitude, positioning the payload such that the center of gravity of the envelope and payload is located on the balloon axis in an initial vertical position and located below said balloon axis in a final horizontal position and the relationship between the center of gravity and center of buoyancy from launch to float altitude is such to effect rotation of the balloon from a vertical ascent attitude to a horizontal flight position, and launching the balloon in an initially vertical position.

* * * * *